Patented Aug. 21, 1934

1,970,651

UNITED STATES PATENT OFFICE 1,970,651

PROCESS OF PREPARING 1.4.5.8-NAPHTHALENE - TETRA - CARBOXYLIC ACID AND DERIVATIVE THEREOF

Heinrich Greune and Wilhelm Eckert, Frankfort-on-the-Main-Hoechst, Germany, assignors to General Aniline Works, Inc., New York, N. Y., a corporation of Delaware No Drawing. Application October 6, 1930, Serial No. 486,861. In Germany October 17, 1929

10 Claims. (Cl. 260—108)

The present invention relates to a process of preparing 1.4.5.8 - naphthalene tetracarboxylic acid and derivatives thereof.

We have found that 1.4.5.8-naphthalene tetracarboxylic acid or derivatives thereof can be easily obtained by causing an oxidizing agent to act upon a compound of the following general formula

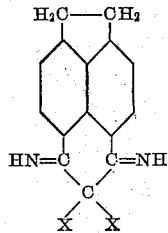
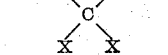

wherein X stands for hydrogen or alkyl or the two X's jointly stand for an organic bivalent substituent or upon a salt of such compound. The reaction takes the following course

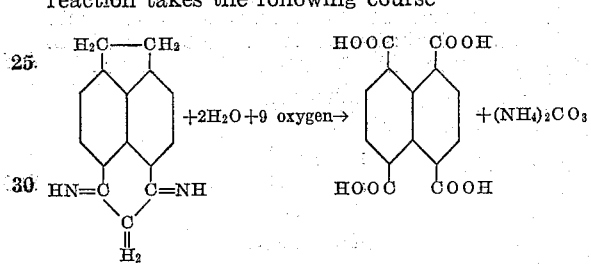

As oxidizing agent there may be used, for instance, alkali metal bichromates, chromic acid, nitric acid, potassium permanganate, a hypochlorite solution, pyrolusite or the like. The oxidation is preferably carried out in the presence of a diluent as, for instance, sulfuric acid the concentration of which can be varied within the widest range.

If according to the present invention 1.4.5.8-naphthalene tetracarboxylic acid is not obtained in quite a pure state it is useful to subject the said acid to a further treatment with potassium permanganate in an alkaline medium.

The following examples illustrate the invention, but they are not intended to limit it thereto; the parts being by weight.

1. 22 parts of the compound of the following formula

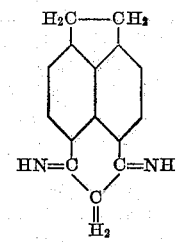

in the form of its hydrochloride are dissolved in 110 parts of sulfuric acid of 60° Bé., about 300 parts of water are added and the whole is heated to 50° C. At this temperature a solution of 110 parts of sodium bichromate in 150 parts of water is slowly added. Stirring is continued for some hours at 50° C.–80° C. The whole is cooled and allowed to stand for a prolonged time whereupon the 1.4.5.8-naphthalene tetracarboxylic acid which has separated is filtered by suction.

The starting material mentioned above may be obtained in the following manner: Into a mixture of aluminium chloride and anhydrous sodium chloride there is added, at about 120° C., a mixture of acenaphthene and malonic acid dinitrile and the whole is stirred at this temperature for about 20 minutes. The melt is then decomposed by means of ice and water and filtered with suction and the product thus obtained is purified.

2. 40 parts of the compound of the following formula:

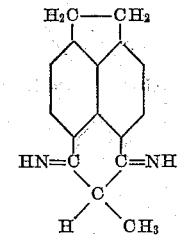

in the form of its hydrochloride are suspended in 400 parts of sulfuric acid of 25–30% strength and 300 parts of concentrated hydrochloric acid. A solution of 130 parts of chromic acid in 150 parts of water is slowly added to this suspension and the whole is heated for some hours to 50° C.–70° C.

After cooling the 1.4.5.8-naphthalenetetracarboxylic acid thus formed is filtered by suction, washed with a small quantity of cold water and dried.

The starting material may be obtained in the following manner: Into a suspension of finely powdered aluminium chloride in chlorobenzene there are introduced simultaneously, while stirring at room temperature, methyl malonic acid dinitrile and acenaphthene. The temperature thereby rises and the melt turns green. Stirring is continued at 80° C.–110° C. until the green mixture has assumed a yellowish coloration. After decomposition and working up, the compound of the above formula is obtained.

3. 40 parts of the starting material of Example 1 are dissolved in 400 parts of sulfuric acid of 60° Bé. An excess of nitric acid of the specific gravity of 1.4 is added to this solution drop by drop while stirring at room temperature. The temperature is then gradually raised to 270° C., ice is added in portions and the 1.4.5.8-naphthalenetetracarboxylic acid which has separated in the form of its anhydride is filtered by suction, washed with cold water and dried.

4. 30 parts of the starting material of Example 1 are dissolved in 130 parts of sulfuric acid of 66° Bé., 240 parts of water are added and the whole is heated to 50° C.–60° C. 300 parts of pyrolusite are then slowly introduced and the mixture is heated for some hours to 50° C.–70° C. After cooling, the whole is filtered by suction, the solid matter is washed with water, the residue is extracted with warm dilute alkali, filtered and the 1.4.5.8-naphthalenetetracarboxylic acid is precipitated from the alkaline filtrate by means of dilute sulfuric acid.

5. 30 parts of the starting material of Example 1 are dissolved in 130 parts of sulfuric acid of 66° Bé., 240 parts of water are added and the whole is heated to 50° C.–60° C. Thereupon 210 parts of potassium permanganate are slowly introduced into this solution and the whole is heated for some hours to 50° C.–80° C. After cooling, the solution is filtered by suction, the solid matter is washed with water, the residue is extracted with warm dilute alkali filtered and the 1.4.5.8-naphthalenetetracarboxylic acid is precipitated from the alkaline filtrate by means of dilute sulfuric acid.

We claim:

1. The process which comprises causing a strong oxidizing agent to act in an acid solution upon a compound of the following formula:

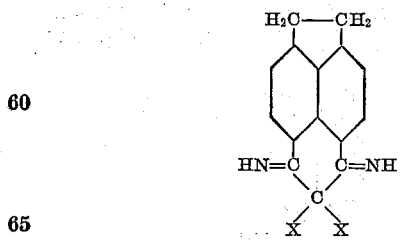

in which

represents a hydrocarbon group which is more readily oxidized than the naphthalene nucleus under the conditions of treatment.

2. The process which comprises causing a strong oxidizing agent to act in an acid solution upon a compound of the following formula:

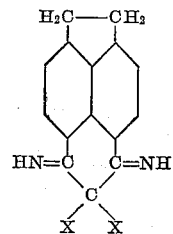

wherein X stands for hydrogen or methyl.

3. The process which comprises causing an oxidizing agent of the group consisting of sodium bichromate, nitric acid, pyrolusite and potassium permanganate to act in an acid solution upon a compound of the following formula:

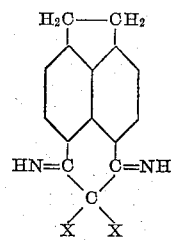

wherein X stands for hydrogen or methyl.

4. The process which comprises causing an oxidizing agent of the group consisting of sodium bichromate, nitric acid, pyrolusite and potassium permanganate to act upon a compound of the following formula:

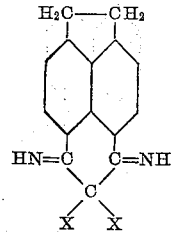

wherein X stands for hydrogen or methyl in the presence of sulfuric acid.

5. The process which comprises causing sodium bichromate in the presence of sulfuric acid to act at a temperature of about 50° C.–80° C. upon the compound of the following formula:

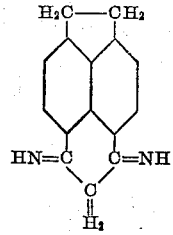

6. The process which comprises causing potassium permanganate in the presence of sulfuric acid to act at a temperature of about 50° C.–80° C. upon the compound of the following formula:

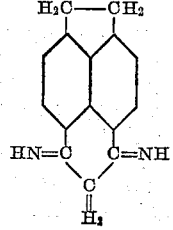

7. The process which comprises causing chromic acid in the presence of sulfuric acid and hydrochloric acid to act at a temperature of about 50° C.–70° C. upon the compound of the following formula:

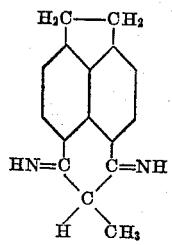

8. The process which comprises causing a strong oxidizing agent to act in an acid solution upon a compound of the following formula:

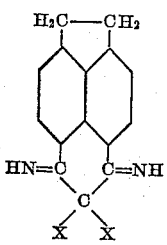

in which

represents a hydrocarbon group which is more readily oxidized than the naphthalene nucleus under the conditions of treatment, and subjecting the product thus obtained to a treatment with a salt having an oxidizing action in an alkaline medium.

9. The process which comprises causing an oxidizing agent of the group consisting of sodium bichromate, nitric acid, pyrolusite and potassium permanganate to act upon a compound of the following formula:

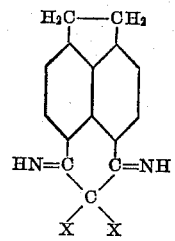

wherein X stands for hydrogen or methyl in the presence of sulfuric acid, and subjecting the product thus obtained to a treatment with potassium permanganate in an alkaline medium.

10. The process which comprises causing a strong oxidizing agent to act upon a compound of the following formula:

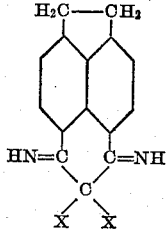

wherein X stands for hydrogen or alkyl.

HEINRICH GREUNE.
WILHELM ECKERT.